(12) United States Patent
Karlapalem et al.

(10) Patent No.: US 8,544,008 B2
(45) Date of Patent: Sep. 24, 2013

(54) DATA PROCESSING SYSTEM AND METHOD FOR CACHE REPLACEMENT USING TASK SCHEDULER

(75) Inventors: Sainath Karlapalem, Bangalore (IN); Bijo Thomas, Kottayam (IN); Nagaraju Bussa, Hyderabad (IN)

(73) Assignee: NXP B.V., Eindhoven (NL)

( * ) Notice: Subject to any disclaimer, the term of this patent is extended or adjusted under 35 U.S.C. 154(b) by 1698 days.

(21) Appl. No.: 11/721,434

(22) PCT Filed: Dec. 5, 2005

(86) PCT No.: PCT/IB2005/054049
§ 371 (c)(1),
(2), (4) Date: Sep. 14, 2007

(87) PCT Pub. No.: WO2006/061767
PCT Pub. Date: Jun. 15, 2006

(65) Prior Publication Data
US 2009/0300631 A1 Dec. 3, 2009

(30) Foreign Application Priority Data
Dec. 10, 2004 (EP) ..................... 04106485

(51) Int. Cl.
*G06F 9/46* (2006.01)
*G06F 13/28* (2006.01)

(52) U.S. Cl.
USPC .......................... 718/102; 711/113

(58) Field of Classification Search
USPC .......................... 718/102; 711/113
See application file for complete search history.

(56) References Cited

U.S. PATENT DOCUMENTS

| 5,579,473 | A | * | 11/1996 | Schlapp et al. ............... 345/557 |
| 5,862,385 | A | | 1/1999 | Iitsuka et al. |
| 6,026,471 | A | | 2/2000 | Goodnow et al. |
| 6,182,194 | B1 | | 1/2001 | Uemura et al. |
| 6,470,424 | B1 | | 10/2002 | Adams |
| 6,754,897 | B1 | | 6/2004 | Ofer et al. |
| 2002/0065980 | A1 | * | 5/2002 | Lasserre et al. ................... 711/3 |
| 2002/0116584 | A1 | * | 8/2002 | Wilkerson .................... 711/133 |

(Continued)

FOREIGN PATENT DOCUMENTS

| GB | 2348306 A | 9/2000 |
| WO | WO03075154 A2 | 9/2003 |
| WO | WO03075154 A3 | 9/2003 |

OTHER PUBLICATIONS

Suh G E et al "A New Memory Monitoring Scheme for Memory-Aware Scheduling and Partitioning" High-Performance Computer Architecture, 2002. Proceedings. Eighth International Symposium on Feb. 2-6, 2002, Piscataway, NJ, USA, IEEE pp. 102-113.

*Primary Examiner* — Menghyao Zhe

(57) ABSTRACT

A data processing system is provided with at least one processing unit (1) for an interleaved processing of multiple tasks (T1-T3), and a cache (5) associated to the at least one processing unit (1) for caching data for the multiple tasks (T1-T3) to be processed by the at least one processing unit (1). The cache (5) is divided into a plurality of cache lines (6). Each of the cache lines (6) is associated to one of the multiple tasks (T1-T3). Furthermore, a task scheduler (10) is provided for scheduling the multiple tasks (T1-T3) to be processed in an interleaved manner by the at least one processing unit (1). A cache controller (20) is provided for selecting those cache lines (6) in the cache (5), which are to be evicted from the cache (5). This selection is performed based on the task scheduling of the task scheduler (10).

7 Claims, 3 Drawing Sheets

Figure 1:
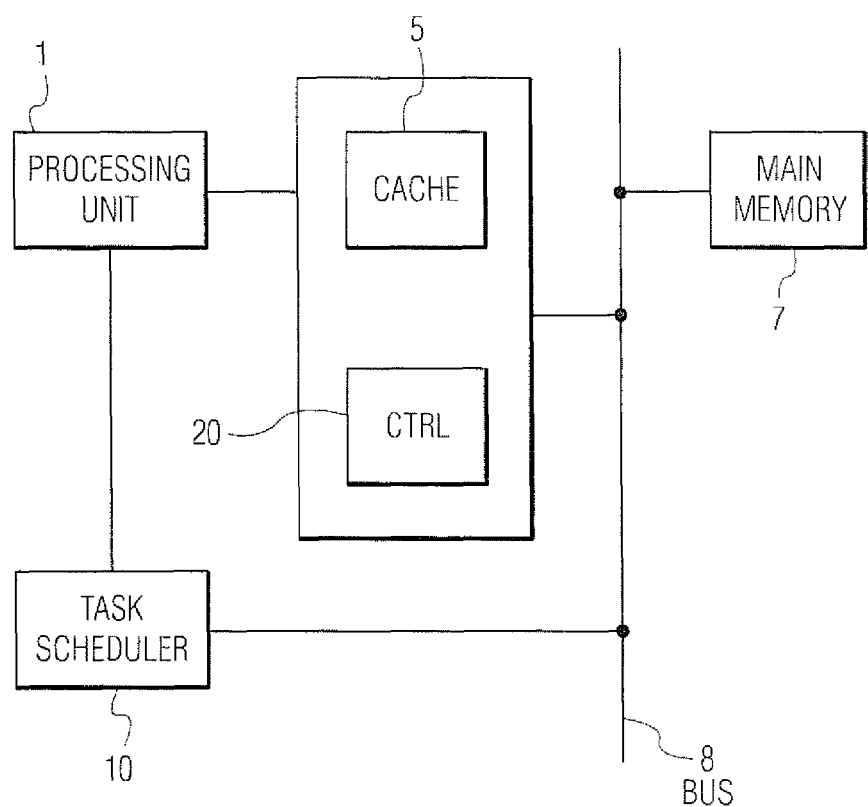

| T1 | T2 | T3 | T1 | T3 | T2 | T1 | T2 | T3 | T1 | T3 | T2 |
|----|----|----|----|----|----|----|----|----|----|----|----|
| 1 | 2 | 3 | 4 | 5 | 6 | 7 | 8 | 9 | 10 | 11 | 12 |

(56) References Cited

U.S. PATENT DOCUMENTS

2003/0041213 A1* 2/2003 Tokar et al. .................. 711/128
2003/0070046 A1 4/2003 Dwyer et al.
2003/0191795 A1* 10/2003 Bernardin et al. ............ 709/105
2003/0225975 A1* 12/2003 Hokenek et al. .............. 711/133

* cited by examiner

| T1 | T2 | T3 | T1 | T3 | T2 | T1 | T2 | T3 | T1 | T3 | T2 |
|----|----|----|----|----|----|----|----|----|----|----|----|
| 1  | 2  | 3  | 4  | 5  | 6  | 7  | 8  | 9  | 10 | 11 | 12 |

DATA PROCESSING SYSTEM AND METHOD FOR CACHE REPLACEMENT USING TASK SCHEDULER

Today's data processing systems or processors are based on a certain memory hierarchy, comprising memories with different speed and sizes. However, as fast memories are expensive, the memory hierarchy is organized into several levels, wherein each level is smaller, faster and more expensive per byte than the next lower level. Usually, all data in one level can also be found in the level below and all data in the lower level can be found in the level below this one until the bottom of the hierarchy is reached. A multi-tasking data processing system with a multiprocessor environment typically comprises a plurality of applications running simultaneously on the respective processors.

A cache memory is the first level of the memory hierarchy, i.e. it is the memory closest to a CPU or a processing unit. If the CPU requests a data item, which can be found in the cache, a so-called cache hit has occurred. However, if the data item requested by the CPU cannot be found in the cache, a so-called cache miss has occurred. The time needed to correct the cache miss and fetch the requested data item depends on the latency and the bandwidth of the memory. The latency corresponds to the time for retrieving a first word of a block and the bandwidth relates to the time to retrieve the rest of a block. The basic idea of a cache is to fetch those data items, which will be needed during upcoming processing cycles before their actual processing. This is also referred to as pre-fetching.

Once a cache miss has occurred, a cache controller has to select the data item or the block currently stored in the cache, which is to be replaced with the desired data item or data block to be fetched. The actual cache replacement can be performed on a randomly basis, a least-recently used LRU basis or on a first in, first out FIFO basis. The random selection is performed by spreading the allocation uniformly, such that blocks are randomly selected. In order to reduce the chance of throwing out information that will be needed during the next upcoming cycles, the accesses to the blocks are recorded in the least-recently used cache replacement scheme. Accordingly, a prediction is calculated based on the past accesses such that those blocks are replaced that have been unused for the longest time period. However, as the LRU cache replacement strategy is calculation intensive, according to the first in, first out replacement strategy, the oldest block is determined for replacement rather than the LRU.

The first in, first out FIFO replacement strategy may also be referred to as round-robin selection. Here, the cache is only updated on a miss rather than on every hit. Replacing a block is performed by updating the data, the address tag and the like. The data block in the cache, which is to be replaced as selected by the cache replacement strategy is referred to the victim. Such a victim block can be moved to a victim buffer. The victim blocks are written to the next level in the memory hierarchy.

Generally speaking, the average memory access time corresponds to the hit time plus the miss rate times the miss penalty. One technique to reduce the miss penalty is the employment of multi-level caches. Here, the actual CPU is ignored while concentrating on the interface between the cache and a main memory. By adding another level of cache between the original cache and a main memory, the first level cache can be designed small enough to match the clock cycle of a fast CPU while a second level cache can be large enough to capture sufficient data which is to be used by the CPU during the upcoming clock cycle.

A further technique to reduce the miss penalties is the employment of victim caches. Here, the data items (victim block), which have been discarded from the cache like the L1 cache can be stored in the victim cache. As the data (victim block), which has been discarded from the cache has already been fetched from a main memory or other cache levels; this data item or data block can be re-used with a low latency. Accordingly, these discarded data items or data blocks are stored in the victim cache. In other words, only those data items are stored in the victim cache, which have been discarded because of a cache miss and a subsequent cache replacement.

Such a victim cache is typically a small fully-associated cache. It is designed for storing blocks, which have been evicted from a CPU cache or a L1 cache due to a conflict miss or a capacity miss. It is typically arranged between the main cache and its refill path. Only those blocks, which have been evicted from the L1 cache due to a cache miss is stored therein. It is used to reduce the cache miss penalty.

A further cache replacement policy is the least-frequently used technique; wherein the least-frequently used block is evicted from the cache to create space for newly prefetched data.

Regarding the cache replacement techniques two issues appear to be important, namely which data block should be fetched into the cache and which data block should be evicted from the cache such that the newly fetched data block can be stored in the cache instead of the evicted data block.

It is an object of the invention to provide a data processing system with a plurality of processing units and caches with an improved cache replacement capability as well as a cache replacement method.

This object is solved by a data processing system according to claim 1 as well as a method for cache replacement according to claim 5.

Therefore, a data processing system is provided with at least one processing unit for an interleaved processing of multiple tasks, and a cache associated to the at least one processing unit for caching data for the multiple tasks to be processed by the at least one processing unit. The cache is divided into a plurality of cache lines. Each of the cache lines is associated to one of the multiple tasks. Furthermore, a task scheduler is provided for scheduling the multiple tasks to be processed in an interleaved manner by the at least one processing unit. A cache controller is provided for selecting those cache lines in the cache, which are to be evicted from the cache. This selection is performed based on the task scheduling of the task scheduler.

Accordingly, the cache replacement is based on the actual task scheduling information. As the task scheduler knows which tasks are to be processed by the processing units during upcoming clock cycles, this information is used by the cache controller to decide which of the cache lines in the cache are to be evicted in order to provide sufficient space for newly pre-fetched data. In other words, by consulting the task scheduling information, it can be ensured that the cache lines corresponding to the next runnable task will not be evicted such that cache misses are reduced.

According to an aspect of the invention, the task scheduler comprises a scheduling table for storing its scheduling pattern. The cache controller comprises a victim control means for storing information on the cache lines which are to be evicted. This information is based on the scheduling pattern as stored in the scheduling table. Accordingly, the cache controller will therefore know which cache line is associated to which of the multiple tasks and according to the task scheduling information from the task scheduler the cache controller can directly select the cache line to be evicted without communicating with the task scheduler beforehand.

According to a further aspect of the invention, the task scheduler comprises a scheduling table for storing its scheduling pattern. The cache controller comprises a victim control means for storing information on those cache lines which are not to be evicted. This selection is again based on the scheduling pattern as stored in the scheduling table. Here, those cache lines are determined which should not be evicted as an alternative embodiment.

According to a further aspect of the invention, the victim control means is updated by the task scheduler according to the scheduling pattern as stored in the scheduling table such that the victim control means does not have to consult the task scheduler before evicting any of the cache lines.

The invention also relates to a method of cache replacement for a cache associated to a processing unit for interleaved processing multiple tasks. The cache comprises a plurality of cache lines; each of the cache lines is associated to one of the multiple tasks, and one of the multiple tasks to be processed in an interleaved manner by the processing unit is scheduled. Those cache lines in the cache to be evicted are selected based on the task scheduling.

The invention is based on the idea to use the information known to the task scheduler to decide which of the actual cache lines in a cache are to be evicted. As the task scheduler knows which of a task in a multi-tasking environment will be the next runnable task on the processing unit, it can be predicted which cache line corresponding is to the task which is the next runnable task, such that the cache line corresponding to this task may not be evicted in order to prevent any cache misses in the upcoming clock cycles.

Figure 2:
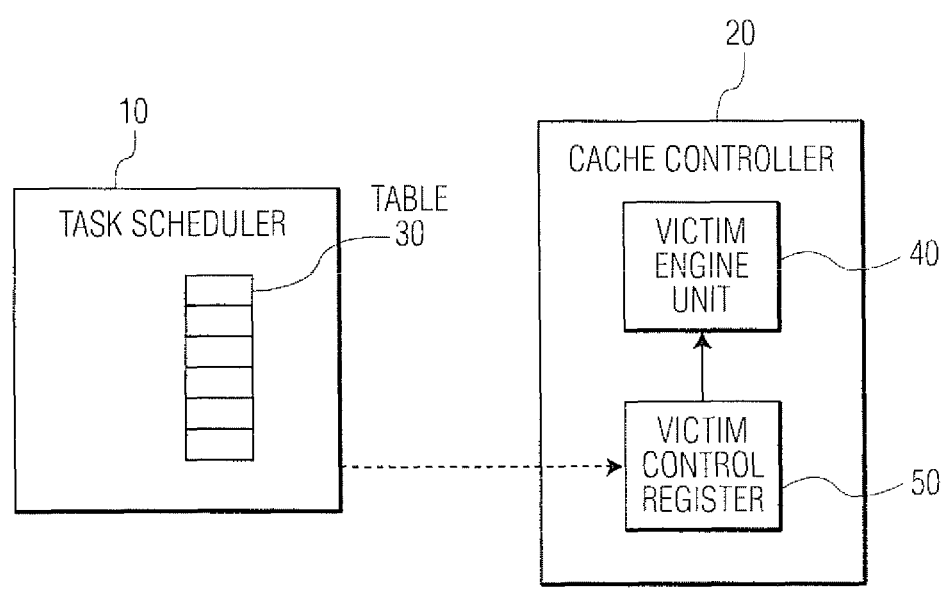
Figures 3, 4:
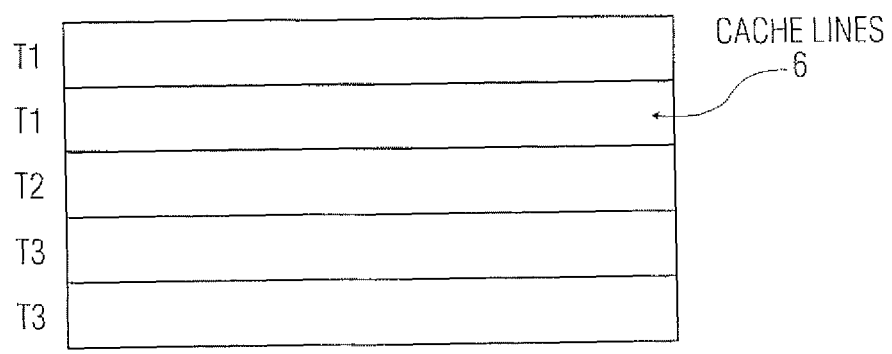

These and other aspects of the invention are apparent from and will be elucidated with reference to the embodiments described hereinafter and with respect to the following figures:

FIG. 1 shows the basic architecture of a data processing system according to the invention, FIG. 2 shows a part of the architecture of FIG. 1, FIG. 3 shows a cache organization of a cache 5 according to FIG. 1, FIG. 4 shows a representation of the schedule instance for a data processing system according to FIG. 1.

FIG. 1 shows a basic block diagram of an architecture of a data processing system according to the invention. The data processing system comprises a processing unit 1, a cache 5, a cache controller 20, a bus 8, a main memory 7 and a task scheduler 10. The main memory 7 is coupled to the bus 8. The cache 5 and the cache controller 20 are as well coupled to the bus 8. The processing unit 1 is coupled to the cache 5. The task scheduler 10 is coupled to the bus 8 as well as to the processing unit 1 and the cache controller 20.

Such a data processing system may be implemented as a system-on-chip. The data processing system according to the first embodiment is in particular applicable to multi-tasking streaming applications, for example for audio and video. However, also other applications can be performed by the data processing system according to the first embodiment.

FIG. 2 shows a part of the system architecture according to FIG. 1. Here, only the task scheduler 10 and the cache controller 20 are shown. All other elements of FIG. 1 have been omitted in order to simplify the figure. FIG. 2 serves to explain the relation between the task scheduler 10 and the cache controller 20 for performing the cache replacement according to the invention. The task scheduler 10 comprises a look-up table/Scheduling table 30. The cache controller 20 comprises a victim control register 50 and a victim engine unit 40. The task scheduling pattern of the task scheduler is stored in the look-up table 30. Accordingly, the table comprises information on which task will be performed by the processing units in the upcoming clock cycles, i.e. which one will be the next running task.

The victim control register 50 is updated by the task scheduler 10 according to the information as stored in the look-up table 30. The victim control register 50 may be implemented as a MMIO register. The above updating may be performed at regular intervals and/or when a change occurs in the look-up table 30.

The victim control register 50 comprises information regarding which task is to be performed during the upcoming clock cycles. This information may be the task ID. The information in the victim control register 50 is updated by the task scheduler based on the task pattern as stored in the table 30. A victim engine unit 40 reads the task ID as stored in the victim control register 50, i.e. victim control unit, as being updated by the task scheduler and compares the task ID with the tags of the cache blocks or cache lines and selects one of the cache blocks or cache lines to be evicted.

The above described cache replacement policy may also be used in combination with prior art cache replacement policies as described above. For example, if there is no cache line corresponding to the next runnable task, the victim selection can be according to conventional cache replacement policies.

FIG. 3 shows a cache organization of a cache 5 according to FIG. 1. In a multi-tasking environment as described according to FIG. 1, multiple tasks or multiple threads need to be scheduled for a single processor or processing unit 1. The processing unit may store multiple contexts relating to different tasks wherein one task may be switched to another if a task is blocked. Accordingly, a cache 5 as described according to FIG. 1 will contain different cache lines 6 with data from different tasks which need to be processed for the application run on the processing unit. The actual cache replacement is performed during the process of bringing or fetching a new cache line which may be required for the task being currently run on the processing unit.

If three tasks T1-T3 are mapped on the processing unit 1, each task T1-T3 may require different cache lines 6 or blocks of the cache. Here in FIG. 3, the first and second cache line is filled with data corresponding to the first task T1. The third cache line contains data corresponding to the second task T2 and the fourth and fifth cache line contains data corresponding to the third task T3.

In order to prefetch new data into the cache which will be required during an upcoming processing of the processing unit; some of the data currently cached in the cache 5 needs to be evicted in order to provide sufficient space in the cache for the newly (pre-) fetched data. The decision which cache line is to be evicted is based on the information of the task scheduler regarding those tasks which are to be processed next.

FIG. 4 shows a table of an example of the task scheduling pattern with regard to the scheduling instance. The top row indicates the ID of the task and the bottom row indicates the scheduling instance 1-12. Accordingly, from FIG. 4 it can bee seen that the task scheduling follows a recurring pattern, namely T1, T2, T3, T1, T3, T2, etc. The task scheduling information is stored in the look-up table 30 in the task scheduler 10 according to FIG. 2. Accordingly, this table contains the information on the next runnable task. In order to avoid any cache misses, those cache lines 6 in the cache 5 as shown in FIG. 3 which are associated to any task which is the next runnable task should not be evicted from the cache.

In order to explain the advantages of the cache replacement technique according to the above embodiments, the cache replacement according to the LRU (least recently used) technique is now described with regard to FIG. 4. The LRU will select those cache lines which are associated to the first task T1 to be replaced when the processing unit 1 executes the third task T3 (the scheduling instance 3) as the cache lines corresponding to the first task T1 will be the cache lines least recently used. However, the cache replacement based on the LRU is not preferable, as the next runnable task will be the first task T1 at schedule instance 4. Accordingly, if the LRU is used, the processing unit 1 will have a cache miss when the first task T1 is scheduled after the third task T3. Therefore, the cache replacement according to the invention, i.e. based on the task scheduling information, is preferable as it can be predicted which is the next runnable task based on the information of the task scheduler. In the example of FIG. 4, the cache replacement technique based on the present invention will choose the cache line which is associated to the second task T2 to be evicted instead of the cache line corresponding to the first task T1.

The above described cache replacement technique can be operated iteratively based on the information of the next runnable task as stored in the look-up table 30.

In other words, the scheduling information is used as input for the replacement technique in order to minimize cache misses in a multi-tasking environment.

It should be noted that the above-mentioned embodiments illustrate rather than limit the invention, and that those skilled in the art will be able to design many alternative embodiments without departing from the scope of the appended claims. In the claims, any reference signs placed between parenthesis shall not be construed as limiting the claim. The word "comprising" does not exclude the presence of elements or steps other than those listed in a claim. The word "a" or "an" preceding an element does not exclude the presence of a plurality of such elements. In the device claim in numerating several means, several of these means can be embodied by one and the same item of hardware. The mere fact that certain measures are resided in mutually different dependent claims does not indicate that a combination of these measures cannot be used to advantage.

Furthermore, any reference signs in the claims shall not be constitute as limiting the scope of the claims.

The invention claimed is:

1. A data processing system, comprising:
at least one processing unit for an interleaved processing of multiple tasks;
a cache associated with the at least one processing unit configured to cache data for multiple tasks to be processed by the at least one processing unit, said cache comprising a plurality of cache lines;
a task scheduler configured to schedule multiple tasks to be processed in an interleaved manner by the at least one processing unit, wherein each of the plurality of cache lines is associated with one of the multiple tasks and the task scheduler comprises a scheduling table for storing its scheduling pattern; and
a cache controller configured to select those cache lines in the cache to be evicted, wherein the selecting is performed based on the task scheduling of the task scheduler, such that cache lines corresponding to a next runnable task will not be evicted, and the cache controller comprises a victim control device configured to store a task identifier based upon an eviction status.

2. The data processing system according to claim 1, wherein the task scheduler comprises:
a scheduling table configured to store its scheduling pattern; and the cache controller comprises:
a victim control device configured to store a task identifier for those cache lines which are to be evicted according to the scheduling pattern stored in the scheduling table.

3. The data processing system according to claim 1, wherein the eviction status corresponds to those cache lines which are not to be evicted according to the scheduling pattern stored in the scheduling table.

4. A data processing system, comprising:
at least one processing unit for an interleaved processing of multiple tasks;
a cache associated with the at least one processing unit configured to cache data for multiple tasks to be processed by the at least one processing unit, said cache comprising a plurality of cache lines;
a task scheduler configured to schedule multiple tasks to be processed in an interleaved manner by the at least one processing unit, wherein each of the plurality of cache lines is associated with one of the multiple tasks and the task scheduler comprises a scheduling table for storing its scheduling pattern; and
a cache controller configured to select those cache lines in the cache to be evicted, wherein the selecting is performed based on the task scheduling of the task scheduler such that cache lines corresponding to a next runnable task will not be evicted, the cache controller comprises a victim control device configured to store a task identifier for those cache lines which are to be evicted according to the scheduling pattern stored in the scheduling table and the task scheduler updates the victim control device according to the scheduling pattern stored in the scheduling table.

5. A method for cache replacement in a cache associated to a processing unit for interleaved processing of multiple tasks, wherein the cache comprises a plurality of cache lines each being associated with one of the multiple tasks, the method comprising:
storing a scheduling pattern in a scheduling table;
scheduling one of the multiple tasks to be processed in an interleaved manner by the processing unit, wherein each of the plurality of cache lines is associated with one of the multiple tasks;
storing a task identifier in a victim control device for those cache lines based upon an eviction status;
selecting those cache lines in the cache to be evicted, wherein the selecting is performed based on the task scheduling and the stored task identifier such that cache lines corresponding to a next runnable task will not be evicted.

6. The method of claim 5, further comprising:
storing information of the next runnable task in a look-up table.

7. The method of claim 5, further comprising:
storing multiple contexts relating to different tasks in the processing unit.

* * * * *